(No Model.) 2 Sheets—Sheet 1.
O. ZWIETUSCH.
MANUFACTURE OF BEER.
No. 504,145. Patented Aug. 29, 1893.
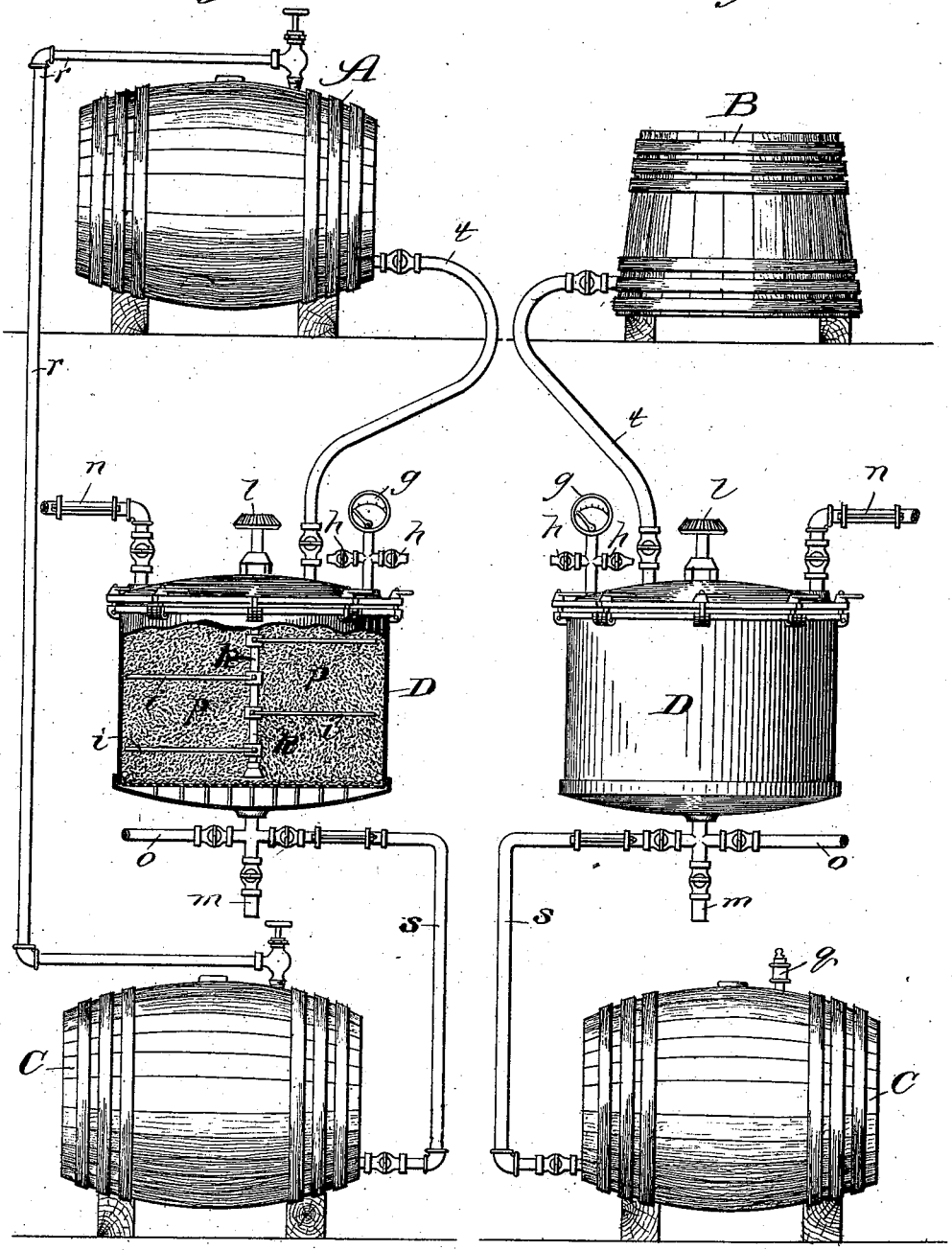

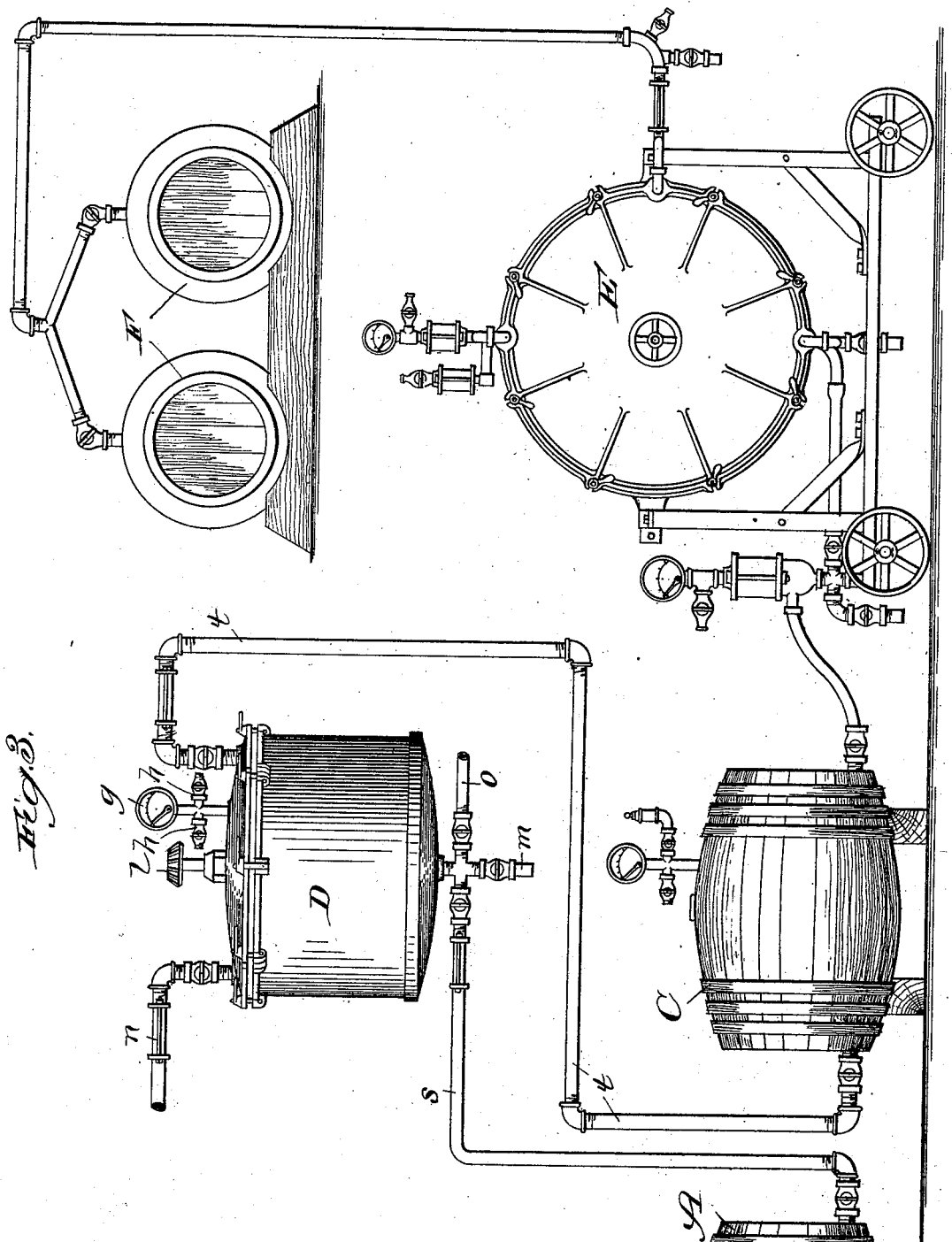

UNITED STATES PATENT OFFICE.

OTTO ZWIETUSCH, OF MILWAUKEE, WISCONSIN.

MANUFACTURE OF BEER.

SPECIFICATION forming part of Letters Patent No. 504,145, dated August 29, 1893.

Application filed May 7, 1889. Serial No. 309,864. (No specimens.)

*To all whom it may concern:*

Be it known that I, OTTO ZWIETUSCH, a citizen of the United States, residing at Milwaukee, in the county of Milwaukee and State of Wisconsin, have invented a new and useful Improvement in the Manufacture of Beer, of which the following is a specification.

The object of my invention is to hasten the manufacture of beer, by providing an effective substitute for the aging process, which is now commonly conducted in what are called "ruh" or storage-casks. The function of the aging process is to eliminate from the beer the yeast which is intimately associated with it after it has undergone the main fermentation, and this aging process, to obtain good results, is required to extend over a period of several weeks, thus forming an expensive factor in brewing. Efforts have been made heretofore, with some degree of success, to provide a substitute for this aging process; but while the time has been reduced and the desired effects in a measure obtained, the substituted treatment itself has always been expensive, and has required the expenditure of several days' time in its application. By my invention the elimination of the yeast, and consequently all the desirable effects of aging, may be effected as rapidly as the beer can be conveniently transferred from one vessel to another; the result being obtained by subjecting the beer to a process of filtration between the time of main fermentation and the time of subjecting it to the carbonating or bunging process employed to give it the degree of life and effervescence necessary to fit it for the market. The turbidity which exists after the necessary effervescence has been imparted to the beer may be removed in any of the well-known ways; but the preferable way is to subject the beer to the common process of filtration while on the way from the bunging casks to the ultimate receptacles, preceded if necessary or desirable by an advance filtration, as set forth in my pending application, Serial No. 308,324, filed April 22, 1889.

In the accompanying drawing, I have represented an apparatus suitable for carrying my invention into effect, but as the apparatus, and particularly the filter, may be greatly varied, I present this particular form of apparatus simply by way of general illustration.

Figure 1 is a side elevation partly in section of an apparatus adapted to carry out my process by conducting the beer from the storage or "ruh" casks through the filtering apparatus into the carbonating or bunging cask. Fig. 2 is a side elevation of an apparatus adapted to carry out my process, by conducting the beer from the fermenting vats direct, through the filtering apparatus into the carbonating or bunging casks without the interposition of the "ruh" or storage-casks; and Fig. 3, a similar view representing an apparatus for carrying out my process, by subjecting the beer to filtration between the storage-casks and carbonating or bunging casks, and then subjecting it to final filtration between the carbonating casks and the ultimate receptacles, in order to impart to it the required degree of brilliancy for the market.

In Fig. 1, A is the "ruh" or storage-cask, which is to be understood as containing beer transferred to it in the usual manner from a fermenting vat, B. C is the carbonating or bunging cask, which in this case is upon a lower floor than the storage-cask; and D is a filtering apparatus, located, in point of altitude, between the two, and communicating with the storage-cask A through a pipe, *t*, provided with suitable valves, and with the carbonating cask C through a pipe, *s*, likewise provided with suitable valves; so that the transfer of the beer from the one cask to the other through the filtering apparatus is effected by gravity. As a preliminary step to the operation of filtering, both vessels and the filter are supplied with air from the ordinary air reservoir to a pressure equal to or slightly in excess of the inherent gaseous pressure in the beer. A pipe, *r*, connecting the tops of the casks A and C maintains an equilibrium of pressure during the transfer. This pipe is likewise provided with valves, so that the communication may be opened and closed at will.

In Fig. 2 the filtering apparatus bears the same relation to the fermenting vat B that in Fig. 1 it bears to the storage-cask A; but in this case as the fermenting vat B is an open vessel, the pipe $n$ is dispensed with, and instead of it, the carbonating or bunging cask C is provided with a safety-valve, $q$. It will thus be seen that my process contemplates passing the beer from the main fermenting-vat B to the cask C either immediately through the filter D, or mediately by way of the storage-cask A.

In Fig. 3 the relation of the vessels and filtering apparatus is the same as in Fig. 1, but since the vessels A and C are upon a common level, the impulsion of the beer through the filtering apparatus D and into the vessels C would be effected by air pressure instead of gravity. The same is true of the impulsion of the beer from the carbonating vessel C, through the final filter E and into the ultimate receptacles F.

The air pressure mechanism for impelling the beer through the filtering apparatuses is not shown in the drawings, because it is well-known and in common use in every brewery.

The carbonating or bunging in cask C may be effected either by the introduction of "kraeusen" in the well-known way, or by the injection of carbonic acid gas, or the introduction of liquid carbonic acid.

The filtering apparatus D, represented in the drawings, is intended to form the subject of a separate application for a patent. It contains a suitable filtering medium, $p$, as to the composition of which I do not limit myself, though I prefer, for some reasons, to employ the substance known as paper-maker's half stuff.

The pipes $o$ and $n$ are inlet and outlet pipes for water used in washing the filter.

The pipe $m$ is a drainage pipe; and the device $l$, $k$, $i$ is a stirrer to aid in the cleansing of the filtering material.

The cocks $h$ serve to admit air to the filter or expel it therefrom as may be required, and the pressure is indicated by the gage $g$.

The filtering apparatus D may be any one of the well-known forms of beer-filter in common use.

For a description of the particular filter and appurtenances represented in the drawings, reference may be had to Letters Patent of the United States, No. 402,500, granted to me on the 30th day of April, 1889, and No. 398,109, granted to me on the 19th day of February, 1889.

What I claim as new, and desire to secure by Letters Patent, is—

1. The method of manufacturing beer, which consists in subjecting it to the main fermentation, then passing it through a filtering material, then carbonating or bunging it to give it the requisite life and effervescence, and finally clarifying it, substantially as described.

2. The method of manufacturing, clarifying and filling beer, which consists in subjecting it to the main fermentation, then passing it through a filtering material, then carbonating or bunging it to give the required life and effervescence, and finally passing it through a filtering apparatus while on its way to the ultimate receptacles, thereby imparting to it the requisite degree of brilliancy for the market, substantially as described.

OTTO ZWIETUSCH.

In presence of—
OSCAR B. ZWIETUSCH,
JOHN G. HIRSCH.